United States Patent [19]

Hardtke

[11] Patent Number: 4,951,902
[45] Date of Patent: Aug. 28, 1990

[54] SUPPORT BRACKET FOR PIPES

[75] Inventor: Hans H. Hardtke, Zeven, Fed. Rep. of Germany

[73] Assignee: Lisega GmbH, Fed. Rep. of Germany

[21] Appl. No.: 352,315

[22] Filed: May 15, 1989

[30] Foreign Application Priority Data

May 20, 1988 [DE] Fed. Rep. of Germany ....... 8806645

[51] Int. Cl.[5] .................................................. F16L 3/08
[52] U.S. Cl. ...................................... 248/74.1; 24/284; 138/106; 248/903
[58] Field of Search ............... 248/74.1, 74.2, 74.3, 248/74.4, 74.5, 73, 65, 67.7, 67.5, 62, 666, 671, 901, 903; 138/103, 105, 106; 24/284

[56] References Cited

U.S. PATENT DOCUMENTS

| 1,517,101 | 11/1924 | Borger | 248/671 |
|---|---|---|---|
| 1,801,500 | 4/1931 | Gottwald | 138/106 X |
| 2,005,701 | 6/1935 | Spackman | 138/106 |
| 2,598,836 | 6/1952 | Scheele | 248/671 |
| 2,661,172 | 12/1953 | Needham | 248/671 |
| 2,952,430 | 9/1960 | Garman | 248/74.4 X |
| 3,145,960 | 8/1964 | Langdon | 248/671 |
| 3,370,815 | 2/1968 | Opperthauser | 138/106 X |
| 3,913,876 | 10/1975 | McSherry | 248/903 X |

FOREIGN PATENT DOCUMENTS

| 2648673 | 5/1978 | Fed. Rep. of Germany | 248/62 |
|---|---|---|---|
| 0203611 | 10/1983 | German Democratic Rep. | 248/74.1 |

Primary Examiner—Ramon O. Ramirez
Attorney, Agent, or Firm—Diller, Ramik & Wight

[57] ABSTRACT

A support bracket for pipes comprising a base of a generally U-shaped configuration defined by a base plate portion and a pair of spaced upstanding generally parallel leg portions. The leg portions each have a pair of shoulders spaced by a slot and each shoulder has an edge curved to mate with an outer convex surface of an associated pipe saddle. Each pipe saddle is in turn opposed by a pipe clip for fastening an associated pipe to the support bracket.

19 Claims, 1 Drawing Sheet

U.S. Patent  Aug. 28, 1990  4,951,902
FIG.1
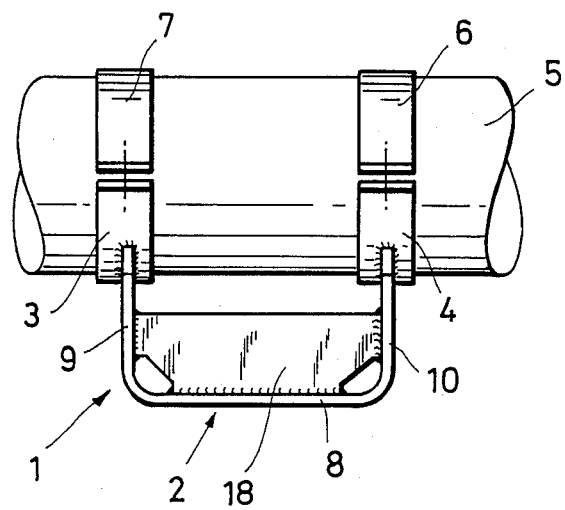
FIG.2
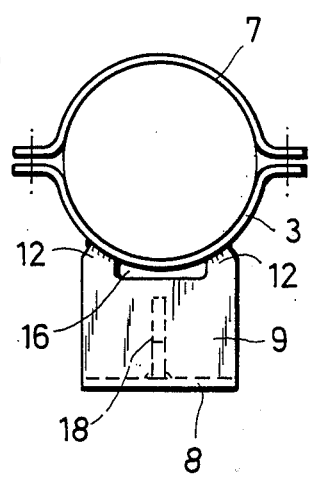
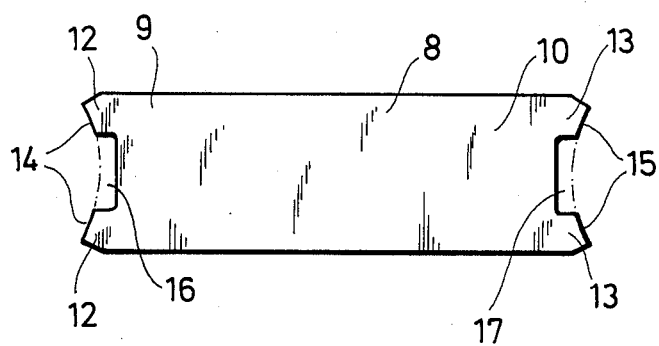
FIG.3

SUPPORT BRACKET FOR PIPES

BACKGROUND OF THE INVENTION

The invention relates to support brackets for pipes of relatively large diameter, particularly to support brackets for pipeline systems in power station applications in which a pipe is clamped between an upper clamping portion and a bottom supporting portion of the support bracket.

Support brackets for pipes which are used in power station applications, particularly to support pipes of diameters of about 15 cm and more up to nominal widths of 500 to 800 mm, generally include a supporting base or bearing block formed of cast iron or heavy rolled metal. The base or block serves as a bottom unit from which stems project and to which a pipe clip is generally secured by welding. The weight of these supports is relatively heavy and, thus, they are both expensive to manufacture and difficult to handle.

SUMMARY OF THE INVENTION

It is a primary object of the present invention to provide a novel support bracket for relatively large diameter pipes of the foregoing type but constructing the same in a rather simple and straightforward manner of lightweight material which can be produced inexpensively, yet provide rigidity when in use. The support bracket of the invention is characterized by a base of a generally U-shaped configuration defined by a base plate portion and two generally parallel spaced upstanding leg portions collectively made of bent sheet metal.

By constructing the support bracket and particularly the base from a generally U-shaped sheet of bent material, a relatively simple and inexpensive support bracket is created. Furthermore, the U-shaped configuration of the base is preferably achieved through cold-forming or cold-working which also lessens the cost and insures that there is sufficient space between the leg portions through which access may be gained to a lower circumferential portion of a pipe wall resting in and spanned between generally upwardly opening U-shaped saddles carried by the leg portions. This available free space between the legs or leg portions of the support bracket and the pipe supported thereby permits pipe insulation to be applied in this area without adversely affecting the support afforded the pipe by the support bracket.

In accordance with another object of the invention, the leg portions of the U-shaped base carry generally U-shaped supporting saddles or clips having an internal concave surface contoured to the exterior circumference of the associated pipe. Exterior convex surfaces of these saddles or clips rest upon and are welded to terminal edges of the base leg portions. Preferably, the base leg portions include terminal ends in the form of shoulders whose terminal edges are contoured to the configuration of the convex saddle surfaces. This constructions imparts high resistance and rigidity to the overall U-shaped base, but the U-shaped base is also somewhat flexible and resilient. The latter two characteristics are beneficial, particularly when it is recognized that a pipe can expand and contract due to the thermal characteristics (hot or cold) of the liquid being conveyed therethrough. Accordingly, the U-shaped base not only affords excellent support for the associated pipe but also permits variations in pipe length and diameter due to thermal expansion or contraction of the pipe because of the thermal characteristics of the liquid therein.

In further keeping with the present invention, the shoulders of each leg portion are preferably spaced from each other by a generally shallow slot opening toward the convex outer surface of the associated saddle which facilitates circumferential expansion and contraction. In addition, the leg portions of the U-shaped base are also preferably spanned and interconnected by a reinforcing plate, and the latter may additionally be secured to the base plate portion of the base. The latter affords the U-shaped support bracket with rigidity, yet still retains a certain degree of resilience and flexibility.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a side elevational view of a support bracket of the invention, and illustrates a pipe seated upon and spanning a pair of saddles which are in turn carried by leg portions of a generally U-shaped base of the support bracket.

FIG. 2 is a front elevational view of the support bracket of FIG. 1, and illustrates details of one of the leg portions and an overlying clamping clip.

FIG. 3 is a plan view of the support bracket of FIGS. 1 and 2 prior to the same being bent to the configuration of FIGS. 1 and 2, and illustrates a relatively planar plate having oppositely directed shoulders spaced by an associated slot with the shoulders having edges contoured to the outer convex configuration of the saddles.

DESCRIPTION OF THE PREFERRED EMBODIMENT

A novel support bracket constructed in accordance with this invention is best illustrated in FIGS. 1 and 2 of the drawing and is generally designated by the reference numeral 1. The support bracket 1 is designed for supporting pipes 5 of relatively large diameters, e.g. diameters of about 15 cm and more up to nominal widths of 500 to 800 mm.

The support bracket 1 is constructed from a metallic plate of sheet material which is normally flat or planar, as illustrated in FIG. 3, but is cold-formed or bent to define a base 2 (FIG. 1) of a generally U-shaped configuration. The base 2 of the support bracket 1 includes a base portion 8 and upstanding generally parallel legs or leg portions 9, 10. The leg portions 9, 10 are generally not only parallel to each other but are also generally normal to the base portion 8. Means 3, 4 in the form of clips, clip elements or saddles are provided for generally supportingly embracing the associated pipe 5 which is positioned in spanning relationship thereto, as is most readily apparent from FIG. 1. The clamping means 6, 7 are associated with the respective saddles 3, 4 in opposing relationship thereto and are designed for clampingly embracing the pipe 5 when cooperative bolts and nuts are fixed through associated openings (unnumbered) in flanges (also unnumbered) projecting laterally (FIG. 2) of the saddles 3, 4 and clips 6, 7 in a conventional manner. As is best illustrated in FIG. 2, the generatrix center (not shown) of the saddles 3, 4 and the clips 6, 7 corresponds to the axis of the pipe 5 and imparts a generally convex configuration to the outer surface (unnumbered) of the generally U-shaped saddles 3, 4.

Prior to the base 2 being bent to the U-shaped configuration thereof, opposite ends (unnumbered) are slotted at 16, 17 (FIG. 3) to define oppositely opening shallow generally U-shaped slots or openings which space from each other a pair of shoulders 12, 12 and 13, 13 having curved terminal edges 14, 15, respectively. The curvature of the edges 14, 15 corresponds to the convex curvature of the saddles or clips 3, 4. Accordingly, when the base 2 is bent from the configuration shown in FIG. 3 to that shown in FIGS. 1 and 2, the edges 14, 15 mate with the convex outer surface of the saddles 3, 4 and offer rigid support thereto when secured by welding (unnumbered) or the like. In addition, the legs 9, 10 can be spanned by a reinforcing bar or plate 18 welded thereto and, if desired, this reinforcing plate 18 can also be welded to the base portion 8. The reinforcing plate 18 preferably lies in a plane which passes through the axis of the pipe 5 (FIG. 2) and through the generatrix centers of the saddles 3, 4 and the clips 6, 7, as is apparent from FIG. 2. Additionally, a plane through each of the leg portions 9, 10 passes generally medially or midway through the width of the clips and saddles 3, 7 and 4, 6, respectively. Thus, the loading of the pipe 5 through the saddles 3, 4 is directed virtually vertically downwardly through the leg portions 9, 10 which offer high rigidity because of the normal relationship of the planes thereof through the axis of the pipe 5. This rigidity and that offered longitudinally by the reinforcing plate or plate portion 18 rigidifies the support offered by the support bracket 1 for the pipe 5 both longitudinally and normal of its axis, though obviously allowing desired resilience and flexibility because of the sheet metal construction which affords some degree of flexture in response to thermal expansion or contraction.

Although a preferred embodiment of the invention has been specifically illustrated and described herein, it is to be understood that minor variations may be made in the apparatus without departing from the spirit and scope of the invention, as defined in the appended claims.

I claim:

1. A support bracket for pipes comprising a base, said base being of a generally U-shaped configuration defined by a base plate portion and a pair iof spaced upstanding leg portions disposed in generally transverse relationship to said base plate portion, means carried by said upstanding leg portions for generally supportingly embracing an associated pipe positioned in spanning relationship thereto, clamping means for clampingly embracing the associated pipe in cooperative opposing relationship to said supporting embracing means, said supporting embracing means being a generally upwardly opening U-shaped clip carried by each leg portion, each U-shaped clip being appreciably wider than its associated leg portion as measured normal to the associated leg portion, each U-shaped clip having a plane normal to its generatrix center, each plane being disposed in the plane of its associated leg portion, and said generatrix centers being generally aligned and being in parallel relationship to an associated pipe embracingly supported thereby.

2. The support bracket as defined in claim 1 wherein said base is formed of bent sheet metal.

3. The support bracket as defined in claim 1 wherein each U-shaped clip has an exterior generally convex surface, and each leg portion has an upper terminal edge contoured to the curvature of said convex surface.

4. The support bracket as defined in claim 1 wherein each U-shaped clip has an exterior generally convex surface, and each leg portion has a pair of spaced shoulders which in turn has an upper terminal edge contoured to the curvature of said convex surface.

5. The support bracket as defined in claim 1 wherein each leg portion has an opening in a terminal end thereof opening toward an associated U-shaped clip.

6. The support bracket as defined in claim 1 including a brace interconnecting said leg portions.

7. The support bracket as defined in claim 1 including a brace interconnecting said leg portions and said base portion.

8. The support bracket as defined in claim 3 wherein each terminal edge is defined by a pair of spaced shoulders.

9. The support bracket as defined in claim 3 wherein each terminal edge is defined by a pair of spaced shoulders, and a slot spacing each pair of shoulders from each other and opening in a direction toward an associated convex surface.

10. The support bracket as defined in claim 8 including a brace interconnecting said leg portions.

11. The support bracket as defined in claim 8 including a brace interconnecting said leg portions and said base portion.

12. The support bracket as defined in claim 1 wherein each plane normal to its generatrix center generally bisects the width of its associated U-shaped clip.

13. The support bracket as defined in claim 12 wherein each U-shaped clip is welded to its leg portion.

14. The support bracket as defined in claim 12 wherein each U-shaped clip has an exterior generally convex surface, and each leg portion has a pair of spaced shoulders which in turn has an upper terminal edge contoured to the curvature of said convex surface.

15. The support bracket as defined in claim 12 wherein each leg portion has an opening in a terminal end thereof opening toward an associated U-shaped clip.

16. The support bracket as defined in claim 12 wherein each terminal edge is defined by a pair of spaced shoulders, and a slot spacing each pair of shoulders from each other and opening in a direction toward an associated convex surface.

17. The support bracket as defined in claim 13 wherein each U-shaped clip has an exterior generally convex surface, and each leg portion has a pair f spaced shoulders which in turn has an upper terminal edge contoured to the curvature of said convex surface.

18. The support bracket as defined in claim 13 wherein each leg portion has an opening in a terminal end thereof opening toward an associated U-shaped clip.

19. The support bracket as defined in claim 13 wherein each terminal edge is defined by a pair of spaced shoulders, and a slot spacing each pair of shoulders from each other and opening in a direction toward an associated convex surface.

* * * * *